United States Patent
Schellens

(10) Patent No.: US 6,428,263 B1
(45) Date of Patent: Aug. 6, 2002

(54) VEHICULAR ROOFTOP LOAD ELEVATING DEVICE

(76) Inventor: Thomas Schellens, 156 Main St., Ivoryton, CT (US) 06442

( * ) Notice: Subject to any disclaimer, the term of this patent is extended or adjusted under 35 U.S.C. 154(b) by 0 days.

(21) Appl. No.: 09/609,866

(22) Filed: Jul. 6, 2000

(51) Int. Cl.[7] .............................................. B60R 9/042
(52) U.S. Cl. ........................ 414/462; 224/310; 224/321
(58) Field of Search ................................ 224/310, 321, 224/326; 414/462

(56) References Cited

U.S. PATENT DOCUMENTS

| | | | |
|---|---|---|---|
| 3,480,166 A | * 11/1969 | Abbott ....................... | 414/462 |
| 3,963,136 A | 6/1976 | Spanke | |
| 4,081,095 A | * 3/1978 | Wilburn et al. ............. | 414/462 |
| 5,058,791 A | 10/1991 | Henriquez et al. .......... | 224/310 |
| 5,346,355 A | 9/1994 | Riemer ....................... | 414/542 |
| 5,348,207 A | 9/1994 | Frank .......................... | 224/310 |
| 5,360,150 A | 11/1994 | Praz ............................ | 224/310 |
| 5,535,929 A | 7/1996 | Neill ........................... | 224/310 |
| 5,560,525 A | * 10/1996 | Grohmann et al. ......... | 224/310 |
| 5,673,831 A | 10/1997 | Spratt ......................... | 224/310 |
| 5,782,391 A | 7/1998 | Cretcher ..................... | 224/310 |
| 5,988,470 A | * 11/1999 | Siciliano ................. | 414/462 X |
| 6,158,638 A | * 12/2000 | Szigeti ................... | 414/462 X |

\* cited by examiner

*Primary Examiner*—Janice L. Krizek
(74) *Attorney, Agent, or Firm*—Fattibene & Fattibene; Paul A. Fattibene; Arthur T. Fattibene

(57) ABSTRACT

A sliding and articulating roof rack adapted to be attached to a rack bar of a conventional roof rack that permits easy loading of an article holder attached thereto. A track attached to the rack bar has a sliding member therein permitting an arm to be moved co-axially along the track until extending out over the vehicle. The arm then pivots downward. The arm has an article holder attached thereto. By pivoting the arm downward, an article holder can be easily loaded with articles to be carried on the roof of a vehicle, such as skis or other items. In one embodiment of the present invention, an angularly fixed slide is slid co-axially with a track attached to a rack bar. A movable slide guide or track is then pivoted downward. A slide contained within the movable slide guide or track is then further extended further while in the downward pivoted position. This embodiment greatly facilitates the loading when vehicles are parked close to each other. The present invention has a relatively simple construction and provides easy adaptability to a conventional rack bar. The present invention permits easy loading of a roof rack. This is particularly advantageous in vehicles having a relatively high roof, such as sport utility vehicles.

17 Claims, 10 Drawing Sheets

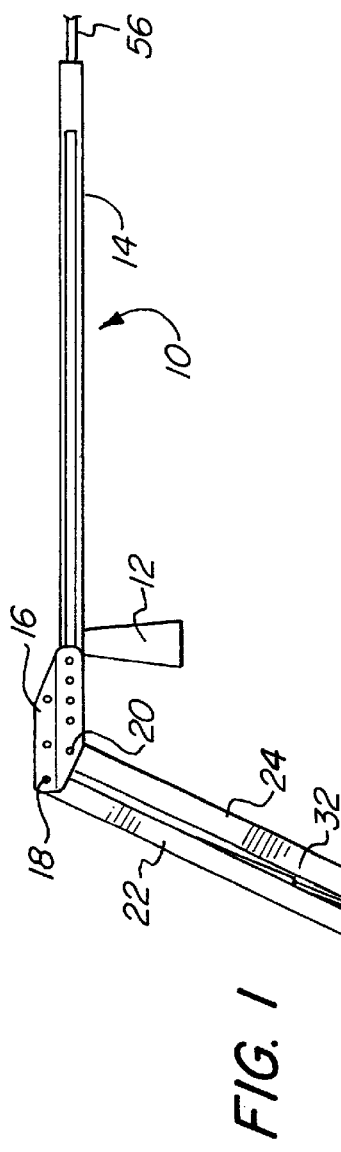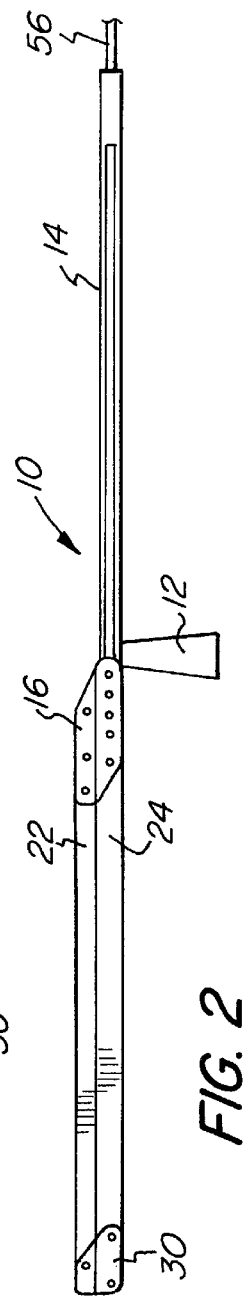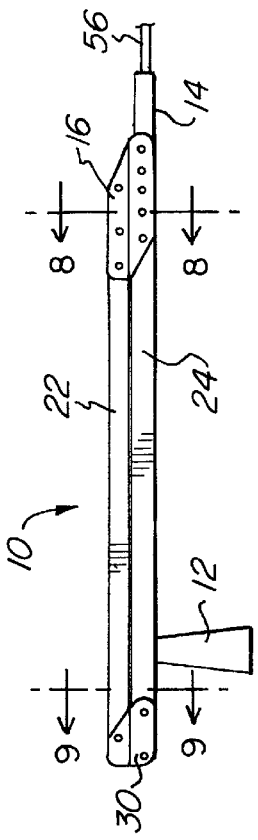

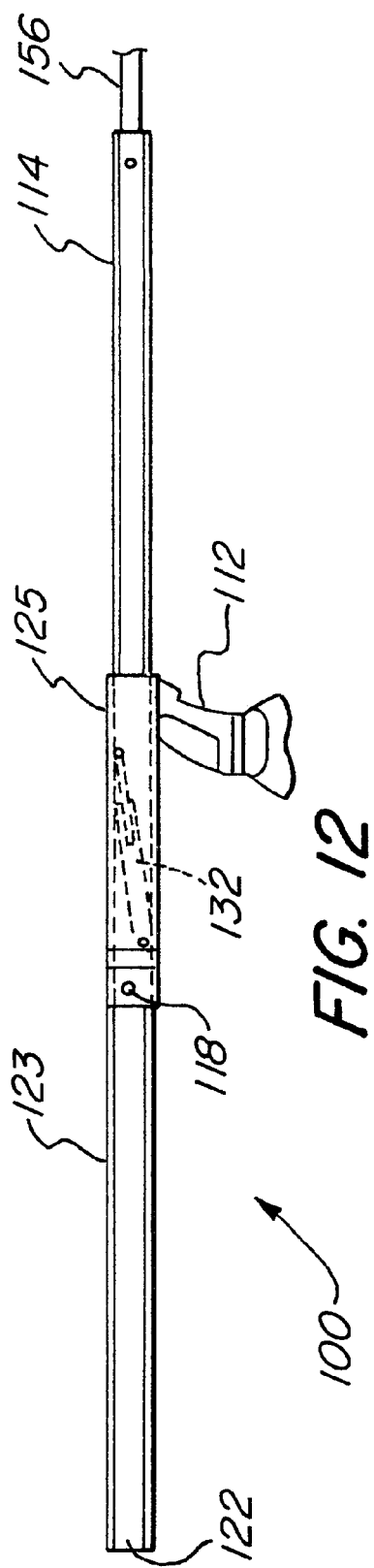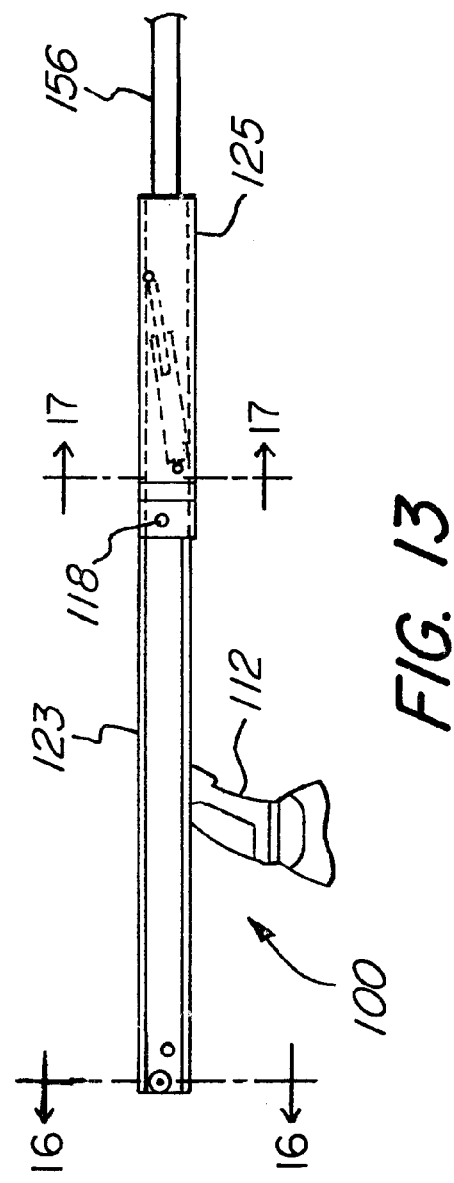
FIG. 12
FIG. 13

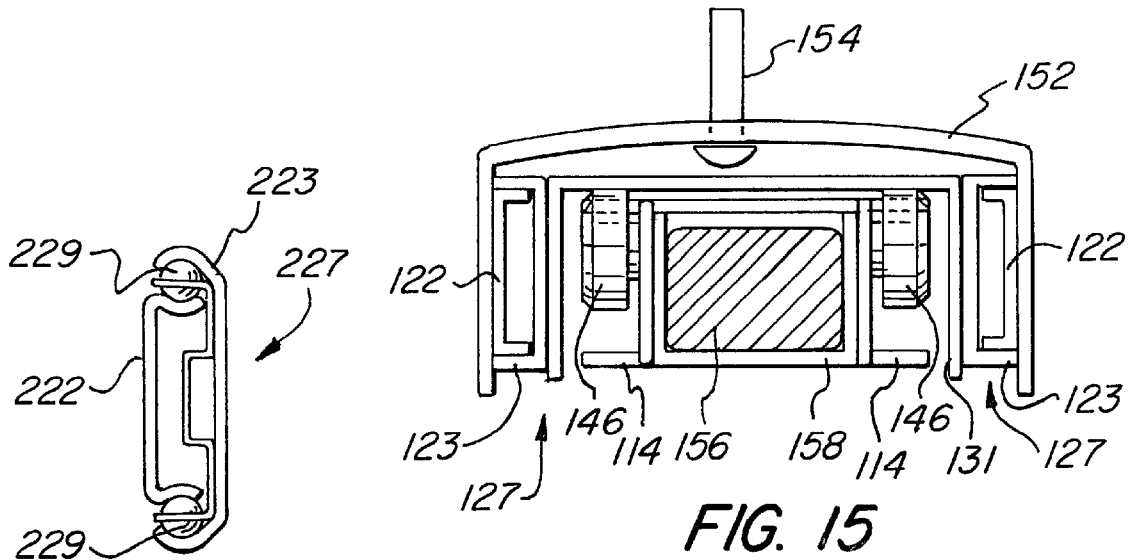
FIG. 16
FIG. 15
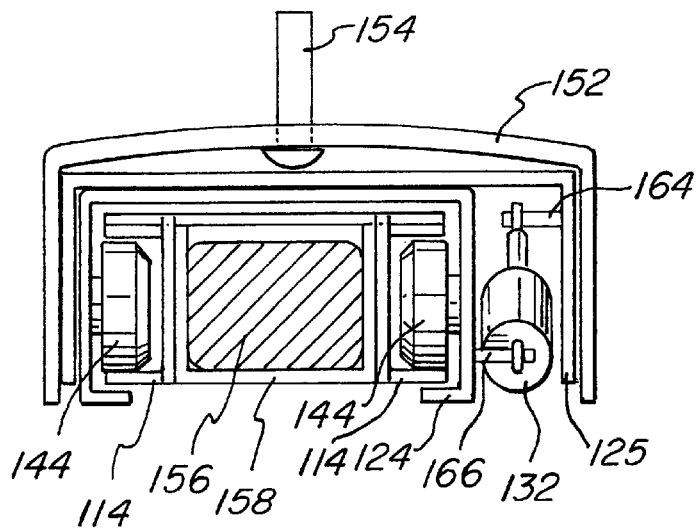
FIG. 17

VEHICULAR ROOFTOP LOAD ELEVATING DEVICE

FIELD OF THE INVENTION

The invention relates generally to an attachment to a roof rack placed on top of a vehicle, and more particularly to an articulating, sliding roof rack that may be lowered for easy loading.

BACKGROUND OF THE INVENTION

Roof racks are commonly used on top of many vehicles. The roof racks increase the storage capacity or carrying capacity of vehicles by permitting placement of articles on top of the roof of a vehicle. Roof racks have been designed to hold a great variety of different articles. For example, skis, canoes, kayaks, windsurfers, surfboards, small boats, and generally any other article that can conveniently be loaded onto the roof rack of a car or vehicle. With the popularity of sport utility vehicles and their use in many recreational activities, the use of roof racks has increased. However, most sport utility vehicles are relatively high, making roof racks difficult to access and load. While there have been many roof racks or roof loading mechanisms, few are simple and easy to load. For example, U.S. Pat. No. 5,348,207 entitled "Vehicle Top Carrier" issuing to Frank on Sep. 20, 1994, discloses a vehicle top carrier having a pivoted connection permitting a drawer to hang down vertically.

Another roof rack is disclosed in U.S. Pat. No. 5,360,150 entitled "Roof Rack For Vehicles" issuing to Praz on Nov. 1, 1994. Therein disclosed is a mechanism for extension permitting the lowering of the extension laterally of the car in order to permit easy manipulations of all types of loads. During lowering, the surface of manipulation remains horizontal.

Another vehicle top carrier is disclosed in U.S. Pat. No. 5,673,831 entitled "Tip Down Vehicle Top Carrier" issuing to Spratt on Oct. 7, 1997. Therein disclosed is a carrier having a roller platform that, when extended with a full load, will gradually tip down.

Another roof rack is disclosed in U.S. Pat. No. 5,782,391 entitled "Vehicle Roof Rack Loading Mechanism" issuing to Cretcher on Jul. 21, 1998. Therein disclosed is a roof rack loading mechanism that may be retrofitted to an existing roof rack system, and tilts down for easy loading.

While all of these roof racks have helped to make the loading of a car or vehicle easier, they are also relatively complicated designs and require extending a portion of the rack laterally far beyond the sides of the vehicle. Accordingly, it is often difficult to deploy and load these racks when the vehicle is parked next to another vehicle, as is often encountered in a parking lot. Therefore, there is a need for an improved roof rack mechanism that can be more easily deployed and is easy to use and manufacture.

SUMMARY OF THE INVENTION

The present invention is directed to a roof rack that slides away from the vehicle and articulates downward for easy loading. In one embodiment, the roof rack comprises a track mounted to a tower placed upon the roof of a vehicle. A wheel plate slides in the track. The wheel plate has an upper and lower arm pivotally connected thereto. The wheel plate is guided by the track and the upper and lower arm can be extended laterally and pivoted down adjacent the vehicle for easy loading. A conventional article holding device is mounted on the upper arm.

In another embodiment, an angularly fixed slide moves horizontally on a track with a movable slide guide pivoting downward attached to the angularly fixed slide. A slide extends from the movable slide guide permitting further extension of an attached cover having a conventional holding device thereon. In this second embodiment, the angularly fixed slide permits the movable slide guide to extend a first distance laterally from the vehicle before pivoting downward. Upon pivoting downward, the slide extends from the movable slide guide a second distance. This embodiment has the advantage that the articulating and sliding roof rack is laterally moved and lowered in a relatively short distance, such as that between adjacent parked cars or other vehicles.

Accordingly, it is an object of the present invention to provide a roof rack that is easily lowered and loaded.

It is an advantage of the present invention that the roof rack may be lowered for loading in a relatively small space, such as that between parked vehicles.

It is a feature of the present invention that a movable slide extends once a portion of the roof rack is angled downward.

These and other objects, advantages, and features will become readily apparent in view of the following detailed description.

BRIEF DESCRIPTION OF THE DRAWINGS

FIG. 1 is a front elevational view illustrating the present invention in a lowered position.

FIG. 2 is a front elevational view of the present invention in a raised extended position.

FIG. 3 is a front elevational view of the present invention in a raised and closed position.

FIG. 12 is a front elevational view of the second embodiment of the present invention in a raised partially extended position.

FIG. 13 is a front elevational view of the second embodiment of the present invention in a raised closed position.

FIG. 15 schematically illustrates a section of the second embodiment of the present invention.

FIG. 16 illustrates an extension slide assembly.

FIG. 17 illustrates another section of the second embodiment of the present invention.

DETAILED DESCRIPTION OF THE PREFERRED EMBODIMENTS

Figure 4:
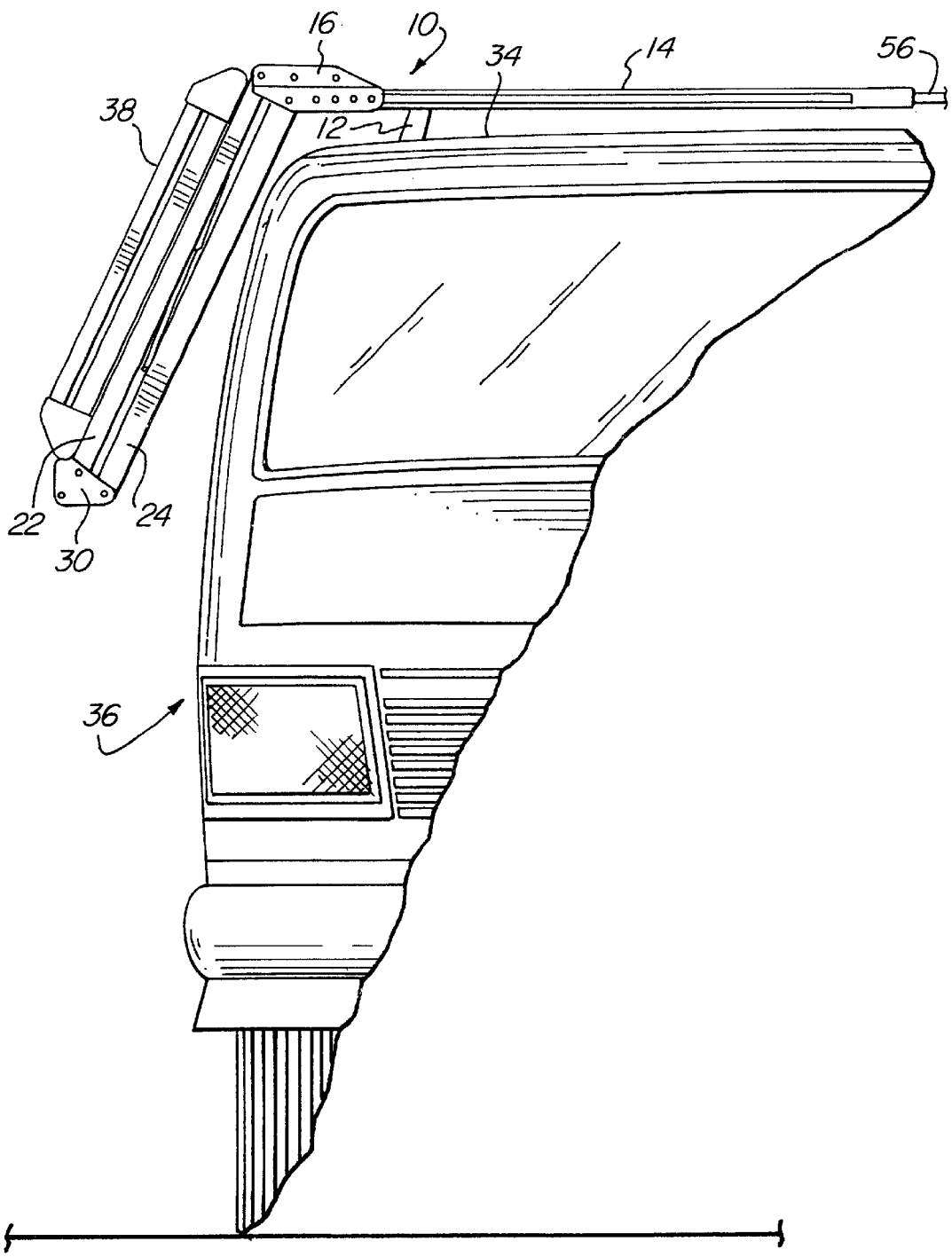
FIG. 4 schematically illustrates the present invention in a lowered position on a vehicle.

FIGS. 1–3 illustrate the present invention and its operation. FIG. 1 illustrates a sliding and articulating roof rack 10 of the present invention in an extended and lowered position. A roof tower 12, which is mounted on the roof of the vehicle, supports a rack bar 56. Rack bar 56 is attached at the other end to another roof tower, not illustrated. Mounted on rack bar 56 is a track 14. A wheel plate 16 has interior wheels riding within the track of track 14. Attached to the wheel plate 16 is an upper arm 22 and a lower arm 24. Upper arm 22 is attached to the wheel plate 16 by upper pivot 18. Lower arm 24 is attached to the wheel plate 16 by lower pivot 20. The other end of the upper arm 22 and lower arm 24 are coupled together by plate 30. An upper pivot 26 extends through plate 30 and the upper arm 22. A lower pivot 28 extends through plate 30 and the lower arm 24. A gas shock 32 is positioned between the upper arm 22 and the lower arm 24 with one end of gas shock 32 attached to the upper arm 22 and the other end attached to the lower arm 24. Gas shock 32 helps to counterbalance the weight of any load as well as the weight of upper and lower arms 22 and 24. As illustrated in FIG. 2, the upper and lower arms 22 and 24 may be pivoted upward parallel to or in-line with the track 14. After being pivoted upward parallel to the track 14, the upper arm 22 and lower arm 24 can be moved over the track 14 guided by the wheels within the wheel plate 16 to a closed position.

FIG. 3 illustrates the closed position of the sliding articulating roof rack 10. In the closed position, the articulating roof rack 10 is conveniently positioned on the roof of a vehicle ready for travel. Any conventional locking means or its equivalent can lock the articulating roof rack 10 in this position.

FIG. 4 illustrates the application of the present invention on a vehicle. The sliding articulating roof rack 10 is mounted on a rack bar 56 which is mounted by roof tower 12 onto the roof 34 of a vehicle 36. An article holder 38 is attached to the upper arm 22. The article holder 38 may be any conventional holding mechanism designed to hold articles such as skis, surfboards, kayaks, canoes, small boats, or any other article capable of being attached to the roof of a vehicle. Article holder 38 may take the form of any conventional or known holders that are mounted to the roof of a vehicle, or any equivalents thereof.

Figure 5:
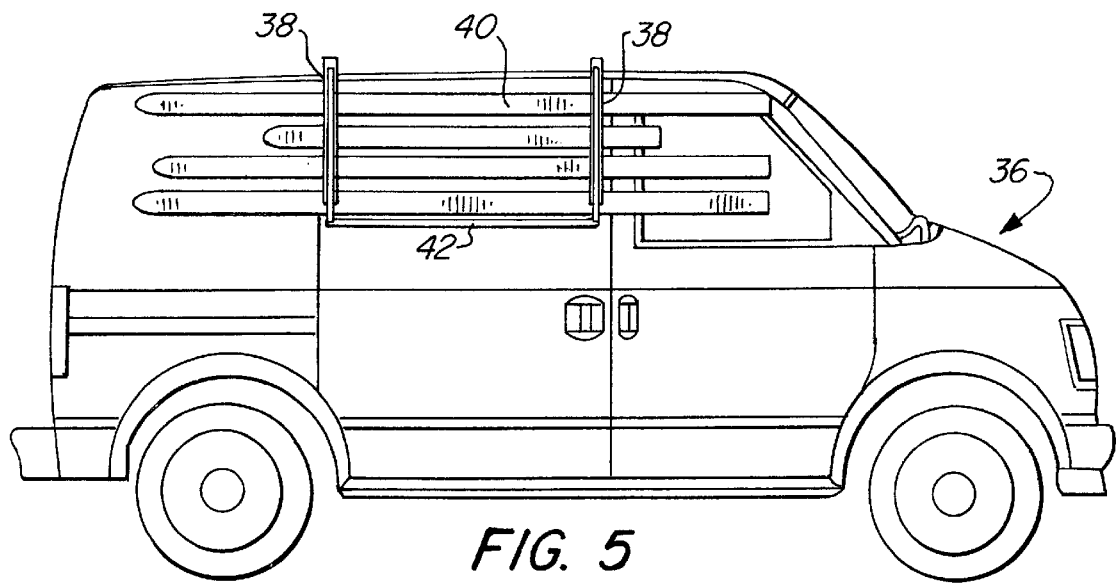
FIG. 5 schematically illustrates the present invention in a loaded lower position.
Figure 6:
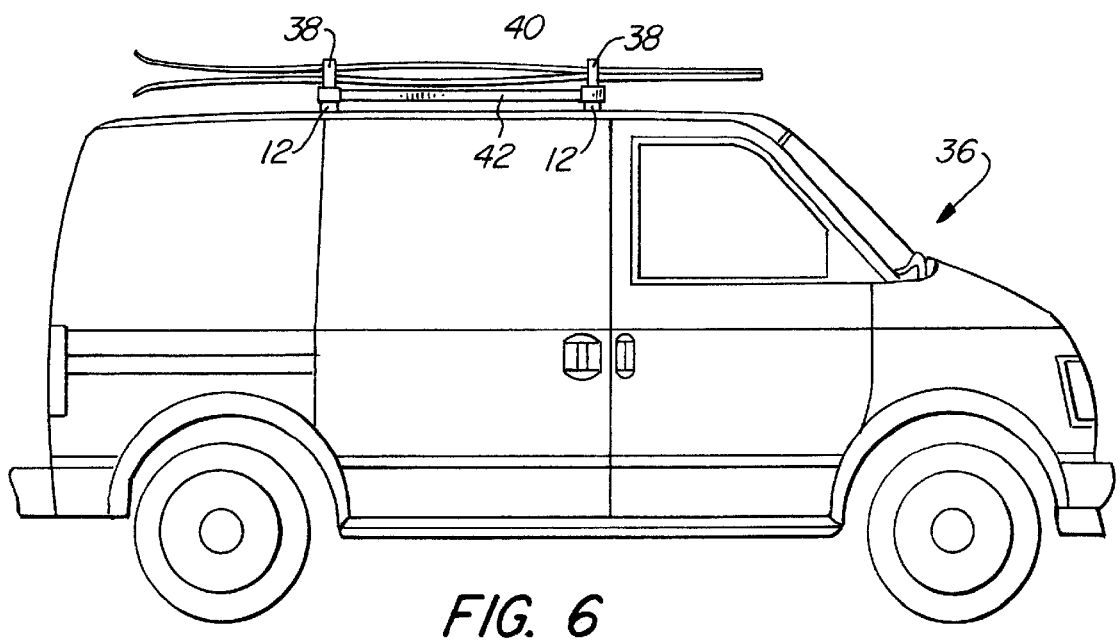
FIG. 6 schematically illustrates the present invention in a loaded raised position.

FIGS. 5–6 more fully illustrates the operation of the present invention and its adaptation to holding a plurality of skis 40 therein. FIG. 5 illustrates the sliding articulating roof rack in an extended and lowered position. A cross-member 42 holds two identical or substantially similar sliding articulating roof racks together. The article holders 38 attached to the sliding articulating roof racks hold the plurality of skis 40. FIG. 6 illustrates the sliding articulating roof rack in a raised and closed position securely on the vehicle 36. The sliding articulating roof rack may be locked in this position with any conventional locking mechanism such as a latch or keyed lock.

Figure 7:
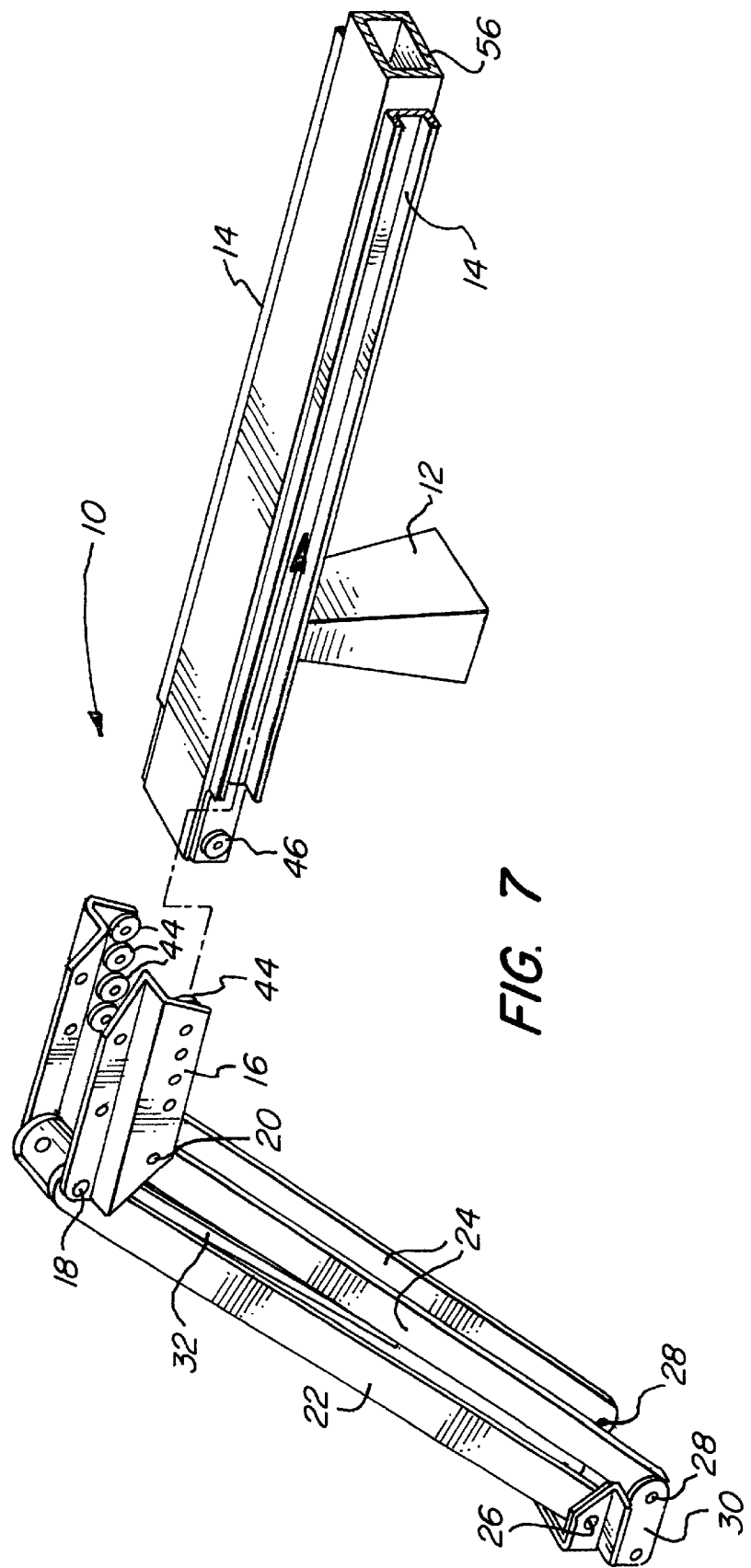
FIG. 7 is a perspective partially exploded view of a portion of the present invention.

FIG. 7 is a perspective partially exploded view illustrating in more detailed the construction of the sliding articulating roof rack 10. Track 14 is secured by any conventional means, such as fasteners or glue to the rack bar 56 attached to the roof tower 12. A plurality of track wheels 44 are placed within the track 14 and are guided thereby. A stop wheel 46 at the end of the track 14 prevents the wheel plate 16, once being inserted within the track 14, from being pulled therefrom. Lower arms 24 are spaced sufficiently to nest between the tracks 14. Upper arm 22 therefore resides on top of the rack bar 56.

Figure 8:
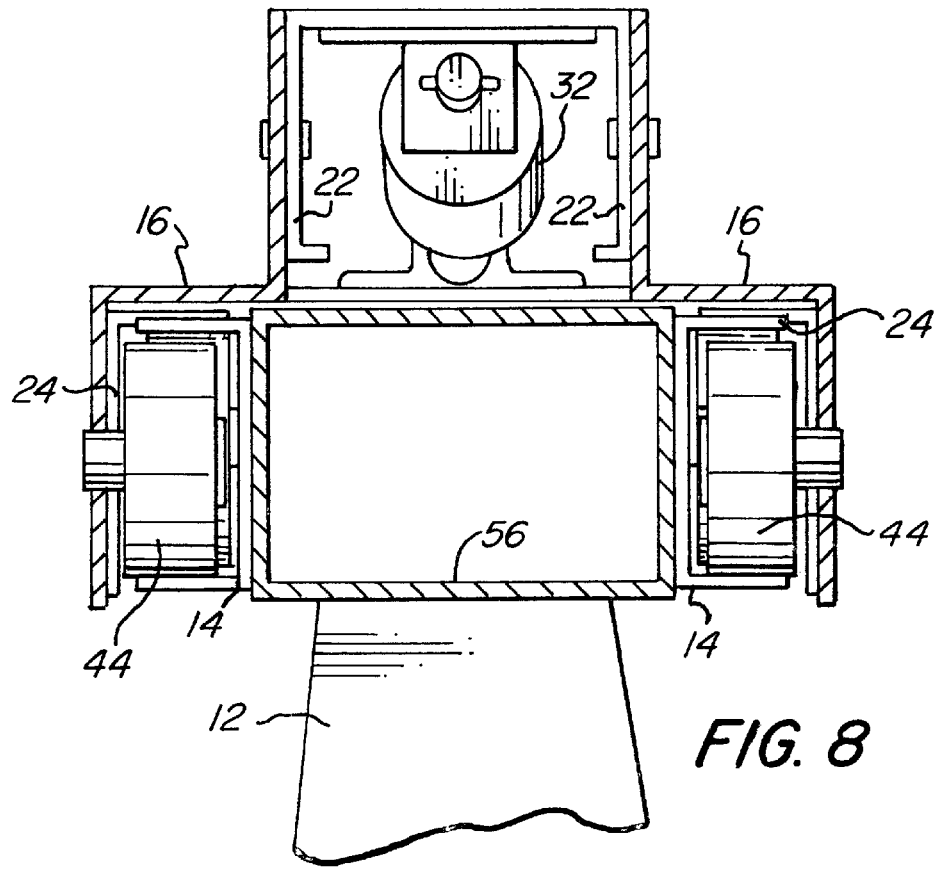
FIG. 8 is a cross section taken along line 8—8 in FIG. 3.

FIG. 8 is a cross-section taken along line 8—8 in FIG. 3. FIG. 8 more clearly illustrates the location of the gas shock 32 within the upper arm 22 above the rack bar 56. On either end of rack bar 56 are attached the tracks 14. Within tracks 14, track wheels 44 roll. The track wheels 44 are held in wheel plate 16.

Figure 9:
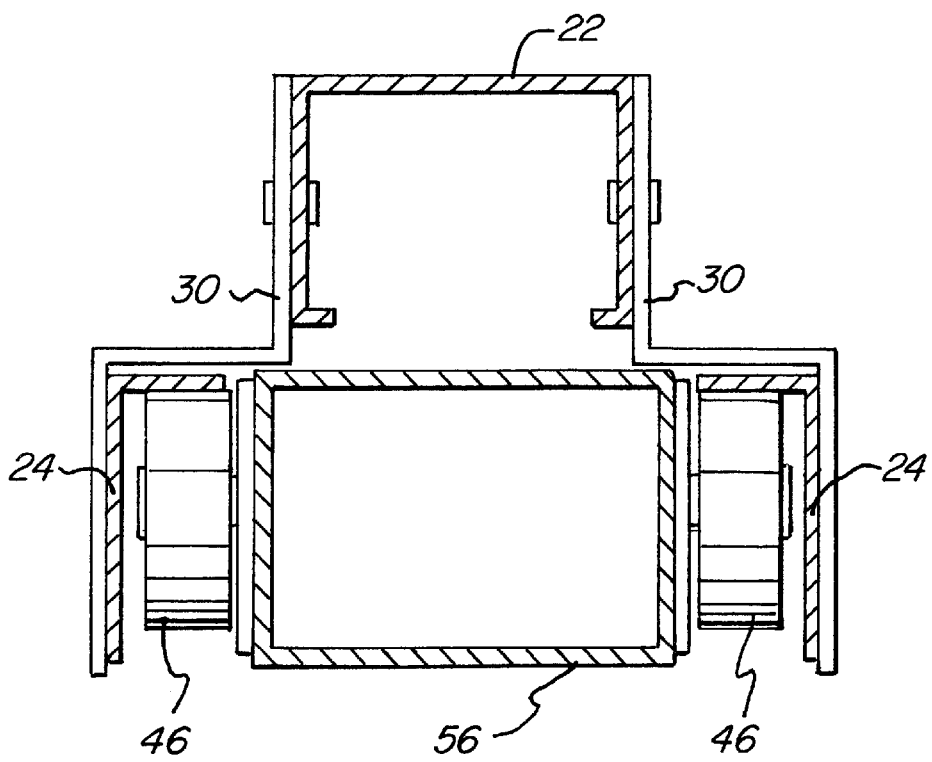
FIG. 9 is a cross section taken along line 9—9 in FIG. 3.

FIG. 9 is a cross-section taken along line 9—9 in FIG. 3. FIG. 9 illustrates the stop wheels 46 and the lower arm 24.

The embodiment of the present invention illustrated in FIGS. 1–9 provide a sliding and articulating roof rack that greatly facilitates the loading of an article holder attached thereto. The upper and lower arms 22 and 24 may be slid or rolled to an extended position and then pivoted downward for easy loading. This embodiment of the present invention is a relatively simple structure and can be attached to a conventional rack bar used in different roof rack systems. An article holder is then attached to the invention for loading of articles.

FIGS. 10–19 illustrate a second embodiment of the present invention having an extension slide assembly. FIGS. 10–13 illustrate the operation of the second embodiment of the present invention. In this second embodiment, the assembly is partially extended laterally, pivoted downward, and then extended further. This second embodiment is particularly applicable to situations in which cars or vehicles are parked closely together making it difficult or impossible to fully extend the assembly prior to pivoting downward.

Figure 10:
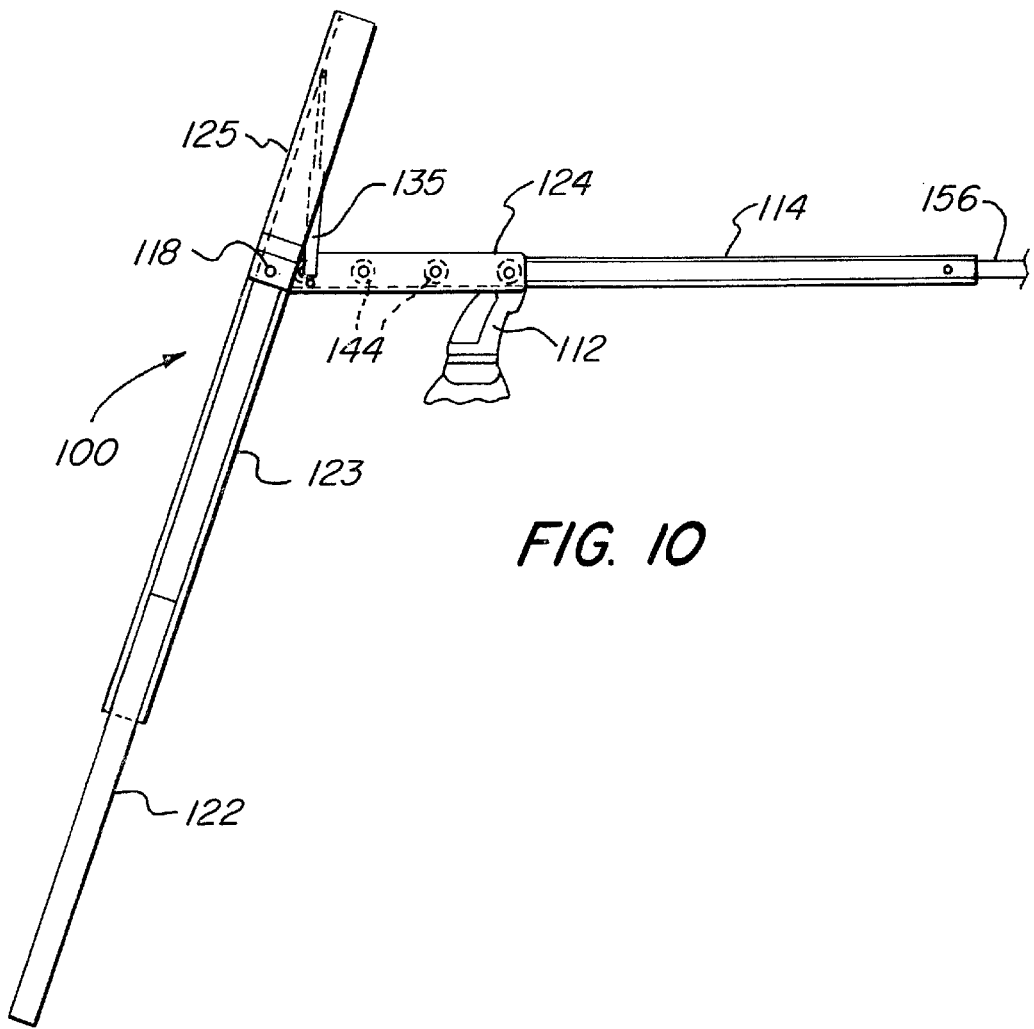
FIG. 10 is a front elevational view of a second embodiment of the present invention in a lowered fully extended position.

FIG. 10 illustrates the sliding articulating roof rack 100 having a track 114 attached to a rack bar 156. The rack bar 156 is attached to tower 112, which is attached to a vehicle. only a portion of the rack bar 156 is illustrated, with the other end of the rack bar 156 attached to a similar tower, not illustrated. An angularly slide 124 has wheels 144 therein. The wheels 144 ride in the track 114. A movable slide guide 123 is pivotally attached to the angularly fixed slide 124 by a pivot 118. An end 125 has one end of a gas shock 132 attached. The other end of the gas shock 132 is attached to the angularly fixed slide 124. Within the movable slide guide 123 is a slide 122.

Figure 11:
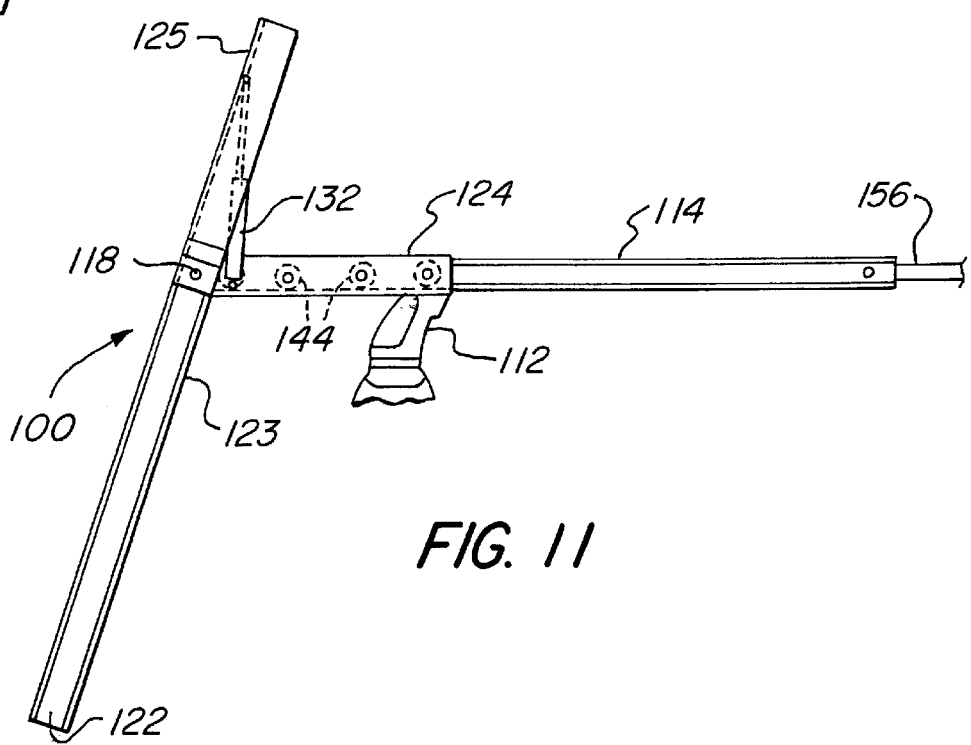
FIG. 11 is a front elevational view of the second embodiment of the present invention in a lowered partially extended position.

FIG. 11 illustrates the sliding articulating roof rack 100 having the slide 122 retracted within the movable slide guide 123. In FIG. 11 the movable slide guide 123 is pivoted downward or in a lowered position.

FIG. 12 illustrates the sliding articulating roof rack 100 in a raised partially extended position with the end 125 nesting over the movable slide guide 124.

FIG. 13 illustrates the sliding articulating roof rack 100 in a raised retracted position. The sliding articulating roof rack 100 may be locked in this position by any conventional means, for example by a latch or a key lock assembly.

Referring to FIGS. 10–13, the operation of the second embodiment can readily be appreciated. In operation, the sliding articulating roof rack 100 is extended partially, for example, approximately eighteen inches or forty-six centimeters horizontally and laterally before pivoting downward. After partially extending, the movable slide guide 123 is pivoted, raising end 125. Once pivoted, the slide 122 is extended, for example at least approximately thirteen inches or thirty-three centimeters, from its closed position within movable slide guide 123. Any article holder, attached to the slide 122, may now be loaded with an article to be carried on the roof of a vehicle. Once loaded, the slide 122 is slid into the movable slide guide 123 and pivoted parallel and horizontal to the rack bar 156. The angularly fixed slide 124 is then slid inward to its closed position.

This second embodiment, illustrated in FIGS. 10–13, is particularly helpful and advantageous in loading an article holder when vehicles are parked relatively close together. The angularly fixed slide 124, which extends only or not more than approximately eighteen inches or forty-six centimeters prior to being pivoted downward, permits the sliding articulating roof rack assembly to be loaded when vehicles are parked relatively close together. Additionally, the extending of the slide 122 after the movable slide guide 123 is pivoted downward permits any attached article holder to be loaded at a more convenient height easily within reach of the user. This greatly facilitates the practicality of a roof rack system. The need for lifting articles to be held on the roof high is therefore eliminated. Additionally, the extending end 125 may be weighted and acts as a counterbalance in combination with the gas shock 132, making the pivoting of the movable slide guide 123 relatively easy.

Figure 14:
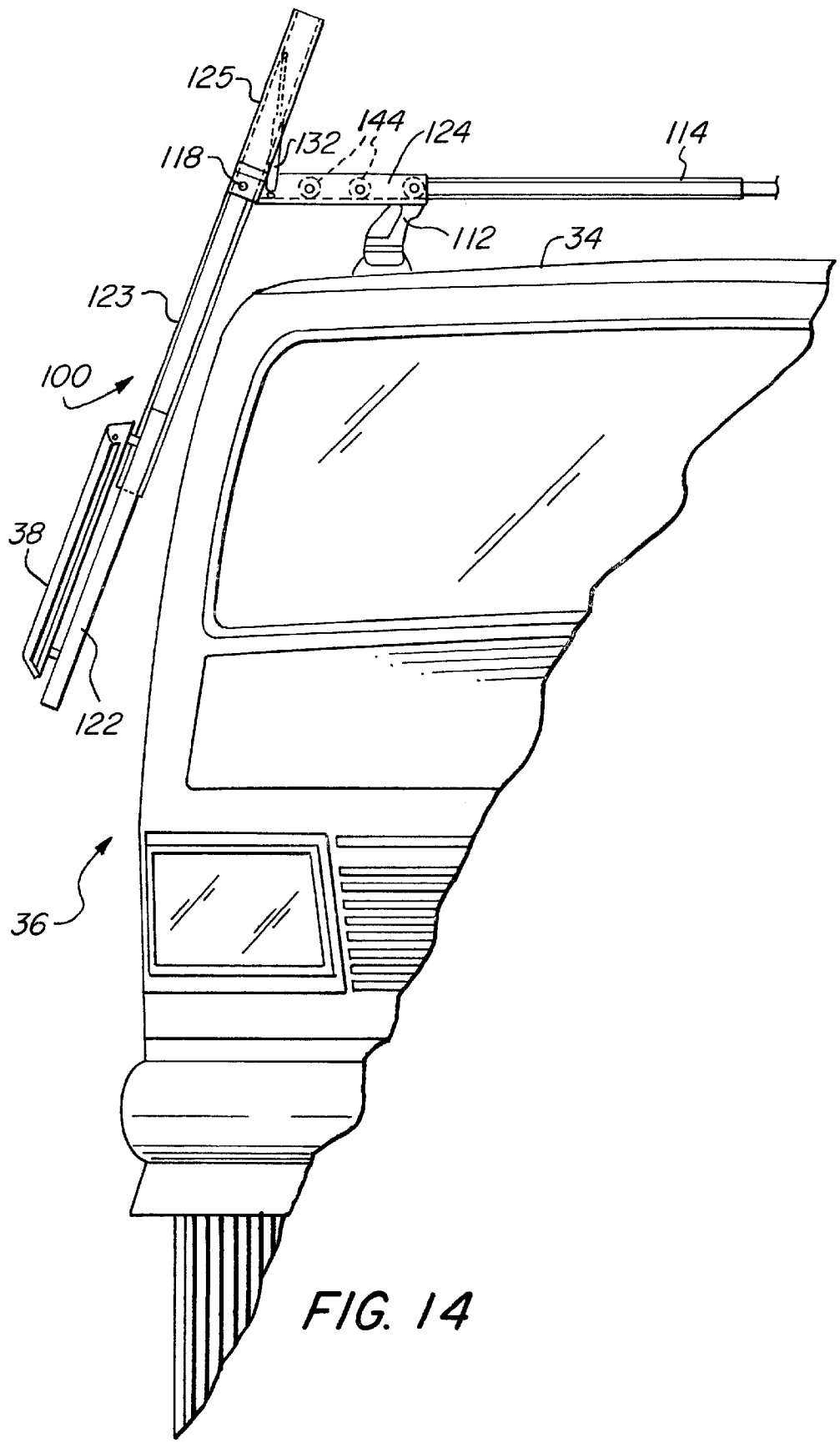
FIG. 14 is a front elevational view illustrating the second embodiment of the present invention in a lowered extended position mounted on a vehicle with an attached article holding apparatus.

FIG. 14 illustrates the sliding articulating roof rack 100 mounted on a roof 34 of vehicle 36. Article holder 38 is attached to the slide 122 and may be any conventional article holder or rack system used to attach articles to a roof or a vehicle.

FIG. 15 schematically illustrates a section of the second embodiment of the present invention. An attachment member or mounting block 158 is attached to the rack bar 156. Mounting block 158 has attached thereto tracks 114. A stop wheel 146 is used to prevent the track from being overextended. Movable slide guide mount 131 has slide and track assemblies 127 mounted thereon. The sliding track assembly 127 has an inner slide 122 contained within the movable slide guide 123. Attached to the slide 122 is cover 152. Cover 152 has a mounting bolt 154 therein. The mounting bolt 154 may be attached to any article holder, not illustrated. The article holder may be any conventional rack system utilized for carrying articles on top of a vehicle.

FIG. 16 illustrates another slot and guide or track assembly 227. The slide and track or guide assembly 227 has a movable slide guide 223 and a slide 224. Between the movable slide guide 223 and the slide 224 are ball bearings 229. The slide guide or track assembly 227 can replace the slide and guide or track assembly 127 illustrated in FIG. 15.

FIG. 17 illustrates a cross-section of another portion of the sliding articulating roof rack. The rack bar 156 has a mounting block 158 attached thereto. Attached to the mounting block 158 are tracks 114. Tracks 14 retain track wheels 144 attached to the angularly fixed slide 124. End 125 covers the angular fixed slide 124. Covering the entire assembly is cover 152. Cover 152 has a mounting bolt 154 thereon. The mounting bolt is used to attach an article holder onto the cover 152. Attached to the end 125 is a pin 154 attached to one end of the gas shock 132. The other end of gas shock 132 is attached to a pin 166 which is attached to the angularly fixed slide 124.

Figure 18:
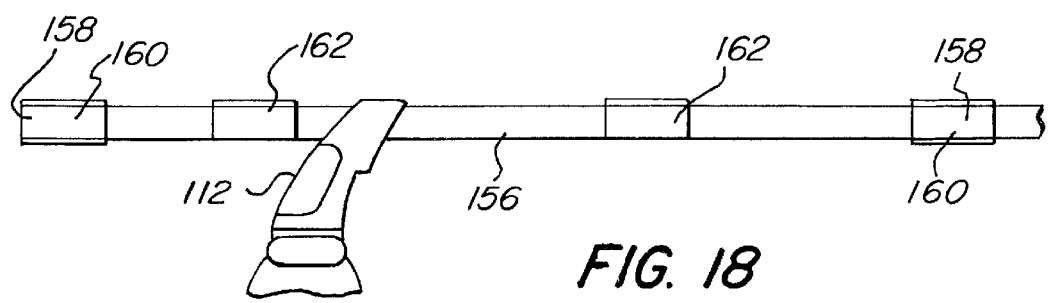
FIG. 18 is a front elevational view of a roof bar modified to accommodate the second embodiment of the present invention.

FIG. 18 illustrates the modification of a conventional rack bar 156 attached to a roof tower 112 for the purpose of attaching the sliding articulating roof rack of the present invention. Mounting blocks 158, having a hole 160 therein, are attached to the rack bar 156. The track 114, illustrated in the prior figures, is attached to the mounting blocks 158. Spaces 162 may be used to provide support or backing to the track 114.

Figure 19:
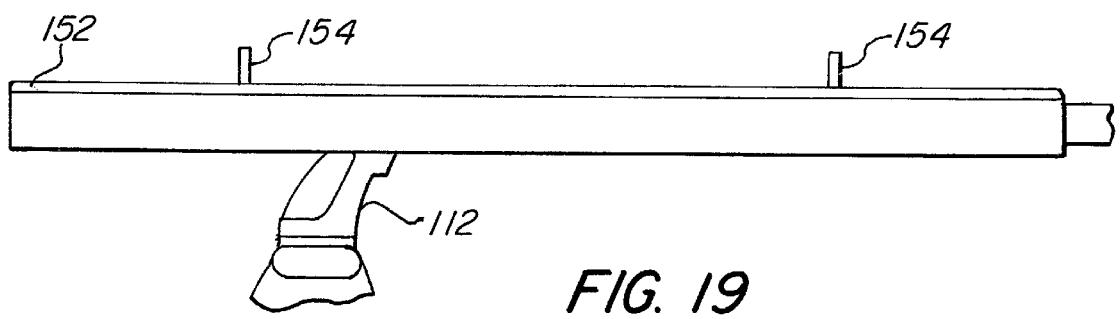
FIG. 19 is a front elevational view illustrating mounting of the present invention on roof bar ready to receive an attachment for holding articles on the roof.

FIG. 19 illustrates the second embodiment of the present invention in assembled form. Cover 152 has mounting bolts 154 attached thereto. Any article holder can then be attached to mounting bolts 154, as illustrated in FIG. 15.

Accordingly, the present invention provides ease and convenience of loading in a simple design that can be attached to or used with a conventional roof rack system. The conventional roof rack system need only have a rack bar on which the present invention can be attached. Therefore, the present invention may be sold as an accessory for attachment to a rack bar of any manufacturer of roof racks. Additionally, the present invention may be sold in combination with a roof rack for placement on vehicles not having an existing roof rack. It should readily be appreciated that the present invention greatly facilitates the ease in which articles, such as skis may be loaded onto an article holder and then placed in position atop the roof of a vehicle. Additionally, one embodiment of the present invention is particularly suited to loading of an article holder between two closely spaced vehicles.

While the present invention has been described with respect to several embodiments, it will be obvious that the teachings of the present invention can be applied to different configurations and that various modifications may be made without departing from the spirit and scope of this invention.

What is claimed is:

1. A sliding articulating roof rack comprising:
    a track attached to a rack bar;
    an angularly fixed slide retained by said track;
    a movable slide guide pivotally attached to said angularly fixed slide guide;
    counterbalance means, attached to said angularly fixed slide and said movable slide guide, for lifting the weight of the sliding articulating roof rack and any article attached thereto; and
    a slide retained within said movable slide guide,
    whereby said angularly fixed slide is extended laterally away from a vehicle, said movable slide guide is pivoted downward, and said slide extended permitting loading.

2. A sliding articulating roof rack comprising:
    a track, attached to a rack bar mounted on a roof of a vehicle;
    first slide extension means, attached to said track, for extending laterally beyond a side of the vehicle;
    second slide extension means, pivotally attached to said first slide extension means, for extending downward below the roof of the vehicle;
    counterbalance means, attached to said first slide extension means and said second slide extension means, for counterbalancing weight; and
    article holding means, attached to said second slide extension means, for holding an article to be carried on the roof of the vehicle,
    whereby said first slide extension means extends a first distance in a first plane parallel with a plane of the roof and said second slide extension means extends a second distance in a second plane below and oblique to the plane of the roof permitting loading of said article holding means at a height lower than the roof.

3. A roof rack comprising:
    a track adapted to be mounted onto a roof of a vehicle;
    a sliding member retained and guided by said track;
    an arm pivotally attached to said sliding member, said arm adapted to receive an article holder; and
    a counterbalance attached to said arm, whereby the arm helps to lift any attached load, said counterbalance comprising a gas shock, whereby the sliding member is slid along the track permitting the arm to be pivotally moved at an angle to the track.

4. A roof rack as in claim 3 further comprising:

a lock, whereby the roof rack can be locked in position.

5. A sliding articulating roof rack comprising:

a track, attached to a rack bar mounted on a roof of a vehicle;

first slide extension means, attached to said track, for extending laterally beyond a side of the vehicle;

second slide extension means, pivotally attached to said first slide extension means, for extending downward below the roof of the vehicle; and article holding means, attached to said second slide extension means, for holding an article to be carried on the roof of the vehicle, whereby said first slide extension means extends a first distance in a first plane parallel with a plane of the roof and said second slide extension means extends a second distance in a second plane oblique to the plane of the roof permitting loading of said article holding means at a height lower than the roof.

6. A sliding articulating roof rack as in claim 5 wherein:

the first distance is greater than the second distance.

7. A sliding articulating roof rack as in claim 6 wherein:

the first distance is not more than eighteen inches or forty-six centimeters, and the second distance is at least thirteen inches or thirty-three centimeters.

8. A sliding articulating roof rack as in claim 6 further comprising:

lock means, associated with the sliding articulating roof rack, for locking the sliding articulating roof rack into a predetermined position.

9. A sliding articulating roof rack for mounting on a rack bar attached to a roof of a vehicle comprising:

an elongated track having a longitudinal length attached to the rack bar;

an angularly fixed slide, said angularly fixed slide retained within said elongated track and adapted to slide a first distance along the longitudinal length of said elongated track;

a movable slide guide having a first end and a second end, said movable slide guide pivotally attached to said angularly fixed slide between the first end and the second end of said movable slide guide, whereby said second end can pivot downward below said elongated track when said angularly fixed slide is extended to an end of said elongated track; and a slide retained within the second end of said movable slide guide, said slide adapted to extend from said movable slide guide a second distance, whereby the roof rack is extended laterally over the side of the vehicle the first distance, pivoted downward lower than the roof of the vehicle, and the slide is extended permitting loading of the roof rack at a height lower than the roof of the vehicle.

10. A sliding articulating roof rack as in claim 9 further comprising:

a gas shock attached to said angularly fixed slide and an end of said movable slide guide.

11. A sliding articulating roof rack as in claim 9 wherein:

the first distance is greater than the second distance.

12. A sliding articulating roof rack as in claim 11 wherein:

the first distance is not more than substantially eighteen inches or forty-six centimeters, and the second distance is at least substantially thirteen inches or substantially thirty-three centimeters.

13. A sliding articulating roof rack comprising:

track attached to a rack bar;

an angularly fixed slide retained by said track;

a movable slide guide pivotally attached to said angularly fixed slide guide; and a slide retained within said movable slide guide, whereby said angularly fixed slide is extended laterally away from a vehicle, said movable slide guide is pivoted downward, and said slide extended permitting loading.

14. A sliding articulating roof rack as in claim 13 further comprising:

an article holder mounted on said slide, whereby articles to be carried by a vehicle can be attached to said article holder at a height lower than a roof of the vehicle.

15. A sliding articulating roof rack as in claim 13 further comprising:

a lock, whereby the roof rack can be locked in position.

16. A sliding articulating roof rack as in claim 13 wherein:

said angularly fixed slide extends a first distance along said track; and said slide extends a second distance out of said movable slide guide, said first distance being greater than said second distance.

17. A sliding articulating roof rack as in claim 16 wherein:

said first distance is not more than eighteen inches or forty-six centimeters, and said second distance is at least thirteen inches or thirty-three centimeters.

* * * * *